Oct. 12, 1965 G. A. WOOD 3,211,250
SEAT-ACTUATED BRAKE AND SWITCH ARRANGEMENT FOR VEHICLES
Filed Dec. 21, 1962 3 Sheets-Sheet 1

INVENTOR.
Garfield A. Wood
BY
Lane, Aitken, Dunner & Ziems
ATTORNEYS

Oct. 12, 1965  G. A. WOOD  3,211,250
SEAT-ACTUATED BRAKE AND SWITCH ARRANGEMENT FOR VEHICLES
Filed Dec. 21, 1962  3 Sheets-Sheet 2

INVENTOR.
Garfield A. Wood
BY
Lane, Aitken, Dunner & Ziems
ATTORNEYS

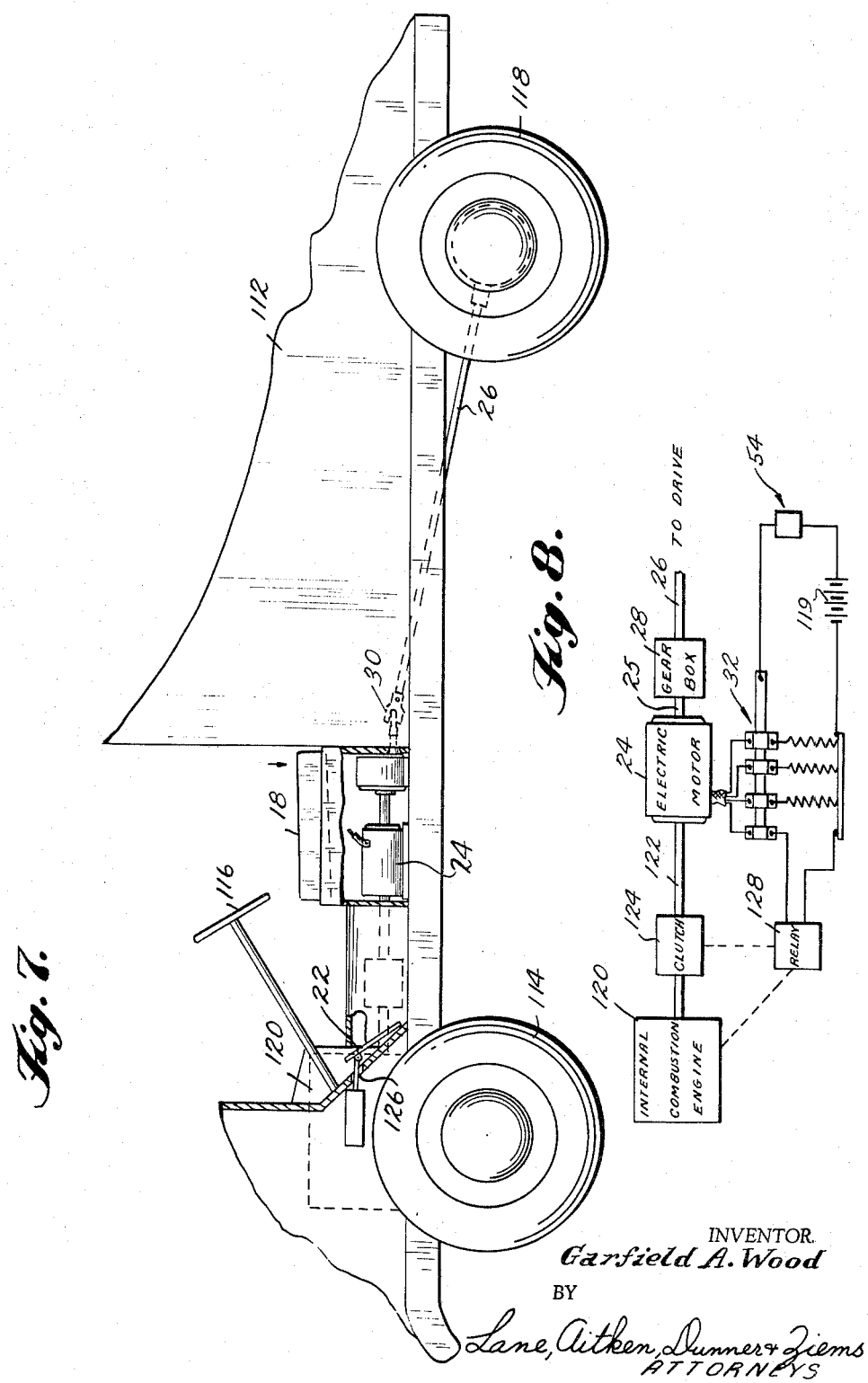

United States Patent Office 3,211,250
Patented Oct. 12, 1965

3,211,250
SEAT-ACTUATED BRAKE AND SWITCH ARRANGEMENT FOR MOTOR VEHICLES
Garfield A. Wood, Alva Base, Miami Beach, Fla.
Filed Dec. 21, 1962, Ser. No. 246,555
1 Claim. (Cl. 180—82)

This invention relates to motor vehicles, and more particularly it concerns a control system by which the transmission of power to a driven wheel or wheels of a vehicle is automatically interrupted and braked in response to predetermined conditions.

Motor vehicles of the type powered by electric motors supplied with current from rechargeable storage batteries have been in considerable demand for use as golf carts, postal delivery carts, industrial trucks and in other applications where numerous stops are incurred during which the operator of the vehicle leaves the driver's seat. A particular problem presented in the use of such vehicles, particularly when they are used as golf carts is that the operator, upon getting out of the vehicle, often fails to completely cut off the motor current or perhaps even more frequently, forgets to properly brake the vehicle. As a result, a golf cart, for example, frequently moves away uncontrolled after the operator has removed himself from the driver's seat, to cause damage to the vehicle or to property situated in the path of the uncontrolled moving vehicle.

Accordingly, a principal object of the present invention is to provide a control system for vehicles of the type referred to by which the above-mentioned problems are effectively and substantially overcome.

Another object of this invention is the provision in a wheeled motor vehicle, of a control system which is responsive automatically to the presence of an operator in the driver's seat of the vehicle.

A further object of this invention is to provide a control system for vehicles of the type referred to by which driving power is rendered inoperative and the vehicle braked automatically by the removal of an operator from the driver's seat of the vehicle.

In general, the aforementioned objects are achieved by a vehicle having at least one drive wheel driven through an appropriate transmission means by a motor operative in response to electric energy and arranging the driver's seat of the vehicle to be movable under the weight of an operator so that a control linkage between the seat and the electric circuit of the motor may render the motor operative when the operator is seated in the driver's seat and inoperative when the operator removes himself from the driver's seat. Desirably, a brake is provided to positively restrain movement of the vehicle, which brake is also actuated in response to movement of the driver's seat to effect not only an interruption of power transmission but also, braking of the vehicle when the operator leaves the vehicle. To supplement the power generated by the electric motor, an internal combustion engine may be provided and coupled by way of a clutch to the motor output shaft. Both manual and automatic control means may be provided by which the internal combustion engine is rendered operative and inoperative.

A more complete understanding of the present invention and its method of use, together with the realization of other objects and further scope of applicability thereof will be appreciated from the detailed description to follow in conjunction with the accompanying drawings wherein like reference numerals designate like parts and in which:

FIG. 7 is a fragmentary side elevation illustrating a vehicle in accordance with a modified embodiment to the present invention; and FIG. 8 is a block diagram illustrating the control system and power plant of the vehicle illustrated in FIG. 7.

Figure 1:
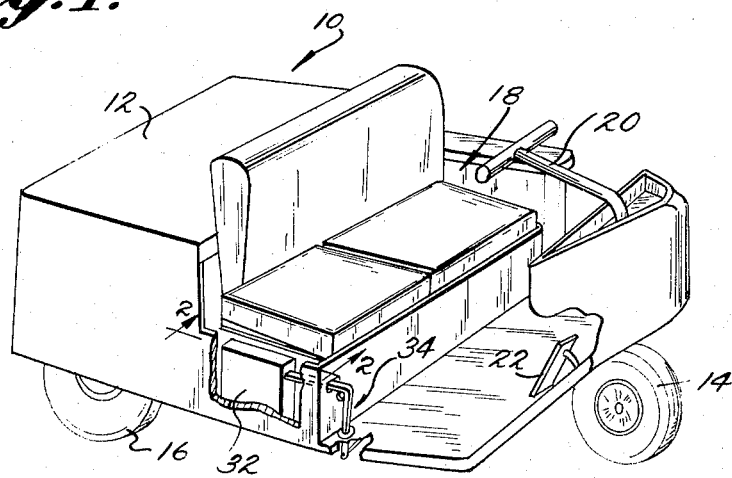
FIG. 1 is a perspective view of a golf cart with which certain features of the present invention are desirably used.
Figure 4:
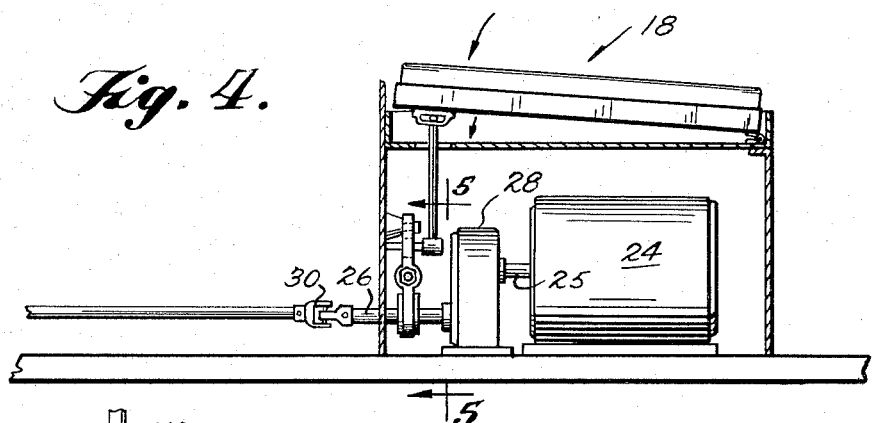
FIG. 4 is a fragmentary cross-section at a reduced scale taken along line 4—4 of FIG. 3.
Figures 5, 6:
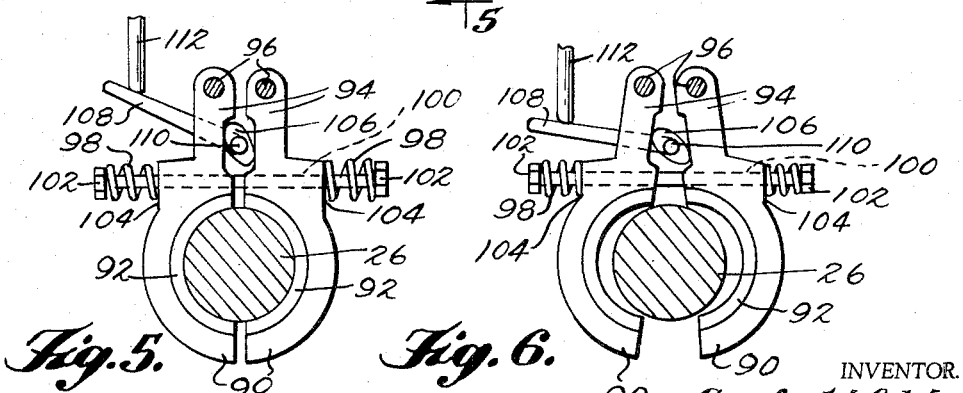
FIG. 5 is an enlarged fragmentary cross-section taken along line 5—5 of FIG. 4 and illustrating the braking device of the present invention.
FIG. 6 is an enlarged cross-sectional view similar to FIG. 5 but illustrating the brake in a released position.

Referring now to the drawing and particularly to FIG. 1 thereof, a conventional golf cart, generally designated by the reference numeral 10 is shown having a body 12 supported on a front steerable wheel 14 and a pair of rear wheels 16, only one of which is shown in FIG 1. A driver's seat generally designated by the reference numeral 18 is provided in the body 12 from which an operator, when seated thereon, may steer the cart by manipulation of a steering arm 20 conventionally connected to the front wheel 14. Also, an accelerator pedal 22 is accessible to the operator when seated on the driver's seat 18 to control forward speed of the vehicle. An electric motor 24 having an output shaft 25 is mounted below the seat 18 for transmitting driving torque to a drive shaft 26 through reduction gearing located within a housing 28. The drive shaft may include a universal joint 30 and is connected to drive at least one of the rear wheels 16 by conventional gearing (not shown). The motor 24 is supplied with electric current through re-chargeable storage batteries carried within the body 12. The speed of the motor 24 and thus the speed at which the cart 10 is driven, may be controlled by a variable resistance device 32 connected by appropriate linkage 34 with the accelerator pedal 22.

The control device 32 is preferably of the type disclosed in my copending application Serial No. 175,963, filed February 27, 1962, now abandoned, and accordingly, includes a plurality of resistance coils 36 (see FIG. 2) electrically connected at one end to a common bus bar 38 and at the other end to isolated terminal elements 40, 41 and 42. A fourth terminal 43 is connected directly to the bus bar 38 to shunt out the resistance elements for maximum speed operation. A conductive, sliding bar 44, movable under control of the accelerator 22 through linkage 34, is slidable in guides 46 to engage the terminals 40–43. The motor 24 and batteries are connected in series with the control device 32 in a manner such that the amount of current supplied to the motor increases as successive ones of the terminals 40–43 are engaged with the slidable conducting bar 44. Although a complete description of the operation of the control device 32 is given in my aforesaid copending application, it will be noted that the motor control circuit is established by a lead 48 extending from one side of the battery to establish a circuit through the bus bar 38, resistance elements 36, sliding bar 44 to a line 50 electrically connected to the bar 44 either by direct connection as illustrated or by way of a suitable brush slidably contacting the bar 44. It will be appreciated, however, that if the connection is direct, the conductor 50 will be flexible to accommodate movement of the bar 44. The other side of the motor circuit is connected by way of a lead 52 through a switch generally designated by the reference numeral 54 to the line 50, thereby completing the motor circuit when the switch 54 is closed.

Figure 2:
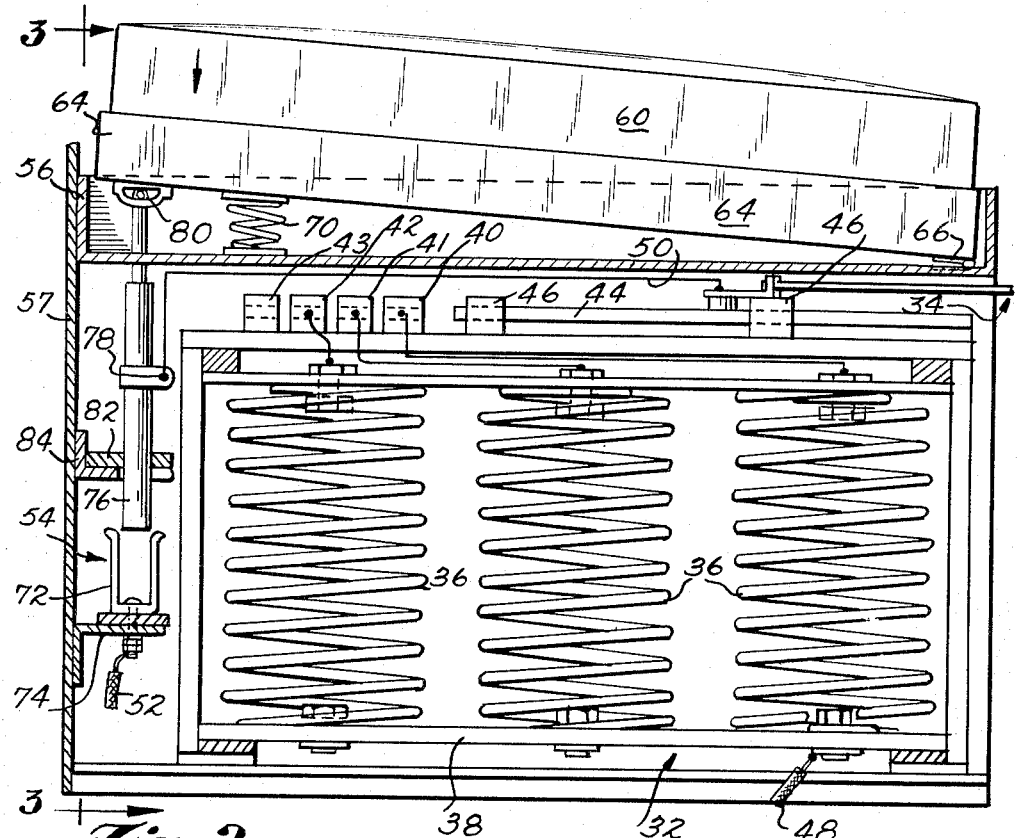
FIG. 2 is an enlarged fragmentary cross-section taken along line 2—2 of FIG. 1.
Figure 3:
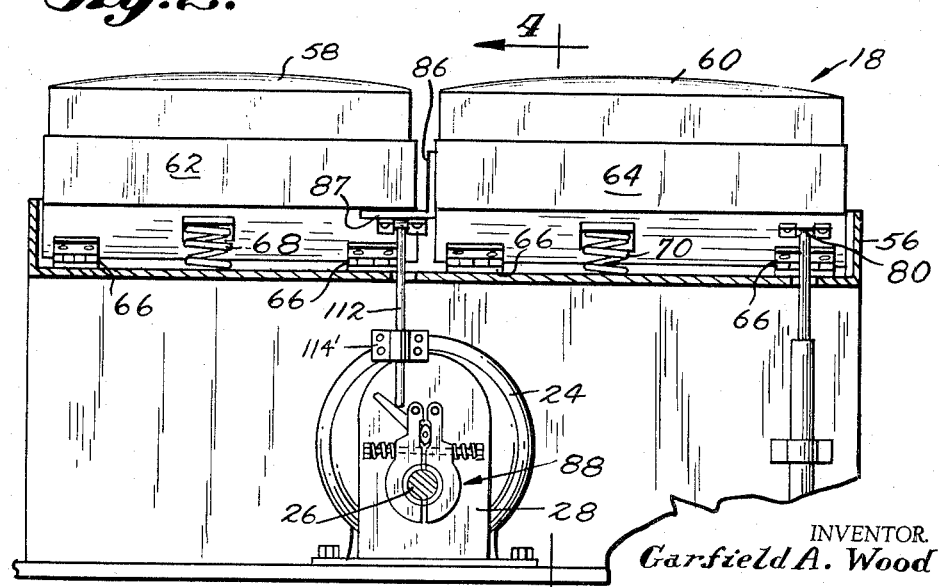
FIG. 3 is an enlarged fragmentary cross-section taken along line 3—3 of FIG. 2.

A preferred structural arrangement by which the present invention functions to interrupt the drive to the rear wheels 16 upon removal of the operator from the driver's seat is shown most clearly in FIGS. 2 and 3 of the drawings. The driver's seat 18, in the form shown, includes a main frame 56 connected to a rear panel 57 and is fixed with respect to the body 12. A pair of cushions 58 and 60 are carried respectively in boxes 62 and 64 pivotally connected to the main frame 56 such as by hinges 66 located, in the form shown, adjacent to the forward edge of the main frame, though it will be appreciated by those skilled in the art that the cushion-supporting boxes 62 and 64 could be pivoted elsewhere to provide limited movement thereof with respect to the main frame 56 under the influence of an operator seated thereon. Resilient means such as coil springs 68 and 70 are provided to yieldably retain the boxes 62 and 64, respectively, in an upward or unoccupied position. The strength of the springs 68 and 70, however, is limited such that the boxes 62 and 64 will be moved downwardly substantially against the bottom of the main frame 56 under the weight of an operator. As shown in FIG. 2, the switch 54 is provided with a bifurcated contact member 72 fixably supported by an insulated bracket 74 on the rear panel 57 and electrically connected to the lead 52. A movable contact member or plunger 76 is electrically connected by way of a terminal clamp 78 to the line 50 which makes contact with the slidable control bar 44. The plunger 76 depends from the rear portion of the cushion box 64 by way of a slidable and pivotal connection 80 and is guided by passage through an apertured insulating block 82 fixed to the panel 57 by way of a bracket 84. Thus, it will be seen that when the seat box 64 is biased upwardly to its unoccupied position, the plunger 76 of the switch 54 is moved out of contact with the bifurcated contact portion 72 thereof to interrupt the motor circuit, thereby preventing the transmission of power by the motor to the drive wheels 16. Although the boxes 62 and 64 are independently movable with respect to the main frame 56 of the seat 18, an L-shaped bracket 86 (FIG. 3) is connected to the box 64 and having a leg 87 arranged to project under the box 62. In this manner, the box 64 will be depressed to its occupied position regardless of whether the operator is seated on the cushion 58 or 60. This is important in such vehicles as golf carts, because of the inclination for an operator to drive the vehicle when seated on either of the cushions.

To positively restrain the drive wheel 16 and thus the vehicle 10 against movement when the operator gets out of the driver's seat 18 a brake 88 is provided to make frictional engagement with the drive shaft 26 when the seat 18 is moved to the unoccupied position. As illustrated in FIGS. 3–6, the brake 88 includes a pair of opposed arcuate shoes 90 each having a friction lining 92 and each having leg portions 94 pivotally supported from the panel 57 of the body 12 such as by pins 96. The shoes 90 are urged against the shaft 26 to apply braking pressure thereto by a pair of coil springs 98 positioned about a rod 100 having heads 102 at each end thereof. Thus, the springs 98 being disposed between the heads 102 and abutment surfaces 104 on the brake shoes 90, operate to urge the shoes into frictional engagement with the drive shaft 26. To release the brake 88, a cam 106 having a torque lever 108 is rotatably supported on a shaft 110 between the leg portions 94 of the brake shoes. It will be appreciated, therefore, that rotation of the cam 106 will move the brake shoes 90 outwardly from engagement with the drive shaft 26 to a position shown in FIG. 6, thereby releasing the shaft for transmission of driving torque to the wheels 16 of the vehicle. Actuation of the release cam 106 is also in response to movement of the seat 18 from an unoccupied to an occupied position, and to this end, a rod 112 depends from the bracket 86 on the seat box 64 in a manner similar to the way the plunger 76 of the switch 54 depends from the seat box 64. The rod is suitably guided by a bracket 114' to make abutting engagement with the lever 108.

The operation of the embodiment illustrated in FIGS. 1–6 will now be apparent. With the seat 18 in the unoccupied position as caused by the springs 68 and 70 urging the seat boxes 62 and 64 upwardly, the switch 54 is held open by removal of the plunger 76 from the bifurcated contact 72 to prevent operation of the motor 24, and thus drive to the wheels 16. Simultaneously, the brake 88 is applied to the drive shaft 26 to positively hold the cart 10 against movement on the ground. Then, as soon as either of the seat cushions 58 or 60 are occupied, the seat box 64 will be moved downwardly to the occupied position to close the switch 54 and disengage the brake 88. The golf cart 10 will then be operated in conventional fashion. As soon, however, as the operator removes himself from either of the cushions 58 or 60, the seat box 64 will be lifted to the unoccupied position, thereby reopening the switch 54 and permitting the brake 88 to engage the drive shaft 26.

In FIGS. 7 and 8, the power plant and control system referred to above with respect to FIGS. 1–6 is shown adapted for use in a truck 112 having front steerable wheels 114 controlled in conventional fashion by a steering wheel 116 and driven rear wheels 118. As in the aforementioned embodiment, the electric motor 24 in a circuit with a battery 119 is controlled by an operator in the driver's seat 18 through the accelerator pedal 22 to drive the rear wheels 118 through a transmission including the drive shaft 26. In this embodiment, however, an internal combustion engine 120 is provided to supplement the power developed by the electric motor 24, and accordingly it is coupled directly to the motor shaft 25 by shafting 122 including a clutch 124. To regulate the speed of the engine 120, the accelerator pedal 122, in addition to being coupled to the electric control device 32, is coupled by conventional linkage 126 to the engine 120. To achieve automatic energization of the internal combustion engine 120, a relay 128 illustrated diagrammatically in FIG. 8, is provided in the motor circuit to actuate the clutch 124 and energize the ignition system of the engine 120 upon the electric motor 24 drawing a predetermined amount of electric current. Thus, as the load on the motor 24 increases to a predetermined point short of its maximum capacity, the clutch 124 is automatically energized together with the internal combustion engine ignition system to start the engine and supply power through the shafting 122 directly through the motor 24 to the drive shaft 26. In addition, conventional manual means (not shown) is provided to start and stop the internal combustion engine 120 as well as to control the clutch 124.

Hence, it will be seen that by this invention there is provided an extremely effective control system by which the above mentioned objects are completely fulfilled. The movement of the seat 18 in response to the presence or absence of an operator thereon is especially desirable and effective in vehicles of the type powered by electric motor-storage battery plants since merely by opening the switch 54 the power supply is cut off. Moreover, the combination of the control system of this invention in such vehicles when used as golf carts, postal delivery carts and the like is especially effective from the standpoint of avoiding accidental operation thereof while the operator is not present as so frequently occurs with presently available models due to the circumstances under which they are used. It will be appreciated, however, by those skilled in the art that the invention is equally applicable to use with other type power plants. For example, the switch 54 could be used in the ignition circuit of an internal combustion engine to turn off the engine each time the operator removed himself from the driver's seat or, by appropriate linkage (not shown), could be adapted to de-energize a clutch in the transmission system of a vehicle regardless of the specific motor unit employed. Also, the brake 88 actuated by the seat 18 could be employed in any vehicle regardless of the particular power plant used. Since many variations and alternative forms of the present invention are thus possible, it is to be distinctly understood that the foregoing description is illustrative only, not limiting, and that the true spirit and scope of the present invention is to be determined by the appended claim.

The invention claimed is:

A wheeled land vehicle comprising in combination: a body; at least one drive wheel on said body; electrical power means on said body for driving said drive wheel, said power means including a drive shaft drivingly connected to said drive wheel; a seat on said body positioned directly above said drive shaft for supporting an operator in position to operate the vehicle; said seat being mounted for limited movement by the weight of the operator between occupied and unoccupied positions; a pair of pivotally mounted brake shoes pivotable between an engaged position in which they frictionally engage said drive shaft and a disengaged position wherein they are pivoted out of engagement with said drive shaft, spring means engaging said brake shoes for normally resiliently biasing said brake shoes toward one another to said engaged position, camming means for camming said brake shoes apart to said disengaged position; a rod, means for slidably mounting said rod on said body between said seat and drive shaft, one end of said rod engaging said camming means and the other end of said rod acting on the underside of said seat, said spring means normally biasing said rod upwardly to resiliently retain the seat in said unoccupied position, said rod actuating said camming means to move said brake shoes to said disengaged position when said seat is in said occupied position, and electrical switch means actuated by said seat for controlling said electrical power means, said switch means de-energizing said electrical power means when the seat is in said unoccupied position and energizing said electrical power means when said seat is in said occupied position.

References Cited by the Examiner
UNITED STATES PATENTS

| | | | |
|---|---|---|---|
| 676,263 | 6/01 | Kitsee | 188—109 X |
| 772,654 | 10/04 | Fraser | 188—109 X |
| 1,277,188 | 8/18 | Bulley | 188—109 |
| 1,368,892 | 2/21 | Carr | 188—109 X |
| 1,606,547 | 11/26 | Ward | 180—65 |
| 1,664,732 | 4/28 | Brodie | 180—82 |
| 1,708,009 | 4/29 | Burger et al. | 188—109 |
| 1,729,015 | 9/29 | Seidman. | |
| 1,956,978 | 5/34 | Nafziger | 180—82 |
| 2,233,798 | 3/41 | Robins | 188—166 X |
| 2,244,216 | 6/41 | Pieper | 180—54 |
| 2,384,782 | 9/45 | Rockwell et al. | 180—54 |
| 2,581,596 | 1/52 | Nims | 180—65 |
| 2,688,388 | 9/54 | Gill | 192—21.5 X |
| 2,911,053 | 11/59 | Ayers et al. | 188—109 |

MILTON BUCHLER, *Primary Examiner.*

A. HARRY LEVY, KENNETH H. BETTS, *Examiners.*